(12) United States Patent
Kent

(10) Patent No.: US 7,322,150 B1
(45) Date of Patent: Jan. 29, 2008

(54) FISHING LURES

(75) Inventor: Christopher W. Kent, Tyler, TX (US)

(73) Assignee: Knight Manufacturing Co., Inc., Tyler, TX (US)

( * ) Notice: Subject to any disclaimer, the term of this patent is extended or adjusted under 35 U.S.C. 154(b) by 0 days.

(21) Appl. No.: 11/357,651

(22) Filed: Feb. 21, 2006

Related U.S. Application Data

(62) Division of application No. 10/838,989, filed on May 6, 2004, now abandoned.

(51) Int. Cl.
*A01K 85/00* (2006.01)
(52) U.S. Cl. .................... 43/42.25; 43/42.28; 43/42.37
(58) Field of Classification Search ............... 43/42.25, 43/43.1, 43.16, 44.8, 42.28, 42.37
See application file for complete search history.

(56) References Cited

U.S. PATENT DOCUMENTS

| | | | | |
|---|---|---|---|---|
| 2,600,002 A | * | 6/1952 | Klein | 43/43.14 |
| 2,814,148 A | * | 11/1957 | Allen | 43/42.25 |
| 2,823,486 A | * | 2/1958 | Behee | 43/43.16 |
| 4,559,736 A | * | 12/1985 | Sienkiewicz | 43/42.25 |
| 5,689,910 A | * | 11/1997 | Kato | 43/42.24 |
| 6,122,856 A | * | 9/2000 | Hnizdor | 43/42.25 |
| 6,634,135 B1 | * | 10/2003 | Rydell | 43/42.1 |

* cited by examiner

*Primary Examiner*—Kurt Rowan
(74) *Attorney, Agent, or Firm*—Charles M. Kaplan

(57) ABSTRACT

Fishing lures and methods of making fishing lures involve the use of plastic film to cover a weight or other part of a lure between the eye of the hook and its bend. The plastic film may be attached to the hook shank by tying one or more knots adjacent the weight. An integral portion of the plastic film may extend beyond the hook and be configured to resemble the tail of an aquatic creature.

4 Claims, 11 Drawing Sheets

FISHING LURES

This application is a Division of, and also a Continuation In Part of, U.S. patent application Ser. No. 10/838,989 which was filed on May 6, 2004, now abandoned, the benefit of which is hereby claimed.

BACKGROUND OF THE INVENTION

This invention relates to fishing tackle and more particularly to fishing lures and methods of making fishing lures.

OBJECTIVES OF THE INVENTION

Accordingly, it is an object of this invention to provide improved fishing lures that include an imbedded fish hook.

Another object is to provide weighted fishing lures that can be easily cast, jigged or trolled.

An additional object is to provide fishing lures that can be used to catch suspended fish.

Another object is to provide fishing lures that can be fished below the surface without requiring that a weight be added to the line ahead of the lure.

A further object is to provide highly colored lures that provoke game fish to strike.

An additional object is to provide brightly colored lures that retain their bright colors.

Another object is to provide fishing lures that are partially covered with plastic film.

Another object is to provide fishing lures that resemble aquatic creatures.

Another object is to affix colorful plastic film to a fishing lure body.

Another object is to add a tail to a fishing lure body.

Another object is to tie plastic film to a weighted fishing hook.

A further object is to provide fishing lures that are durable, economical to manufacture, highly attractive, easy to use, and which do not possess defects found in similar prior art fishing tackle.

A further object is to provide improved methods for making each of the types of fishing lures described above.

Other objects and advantages of the fishing lures and manufacturing methods incorporating this invention will be found in the specification and claims and the scope of the invention will be set forth in the claims.

DESCRIPTION OF THE INVENTION

Figure 6:
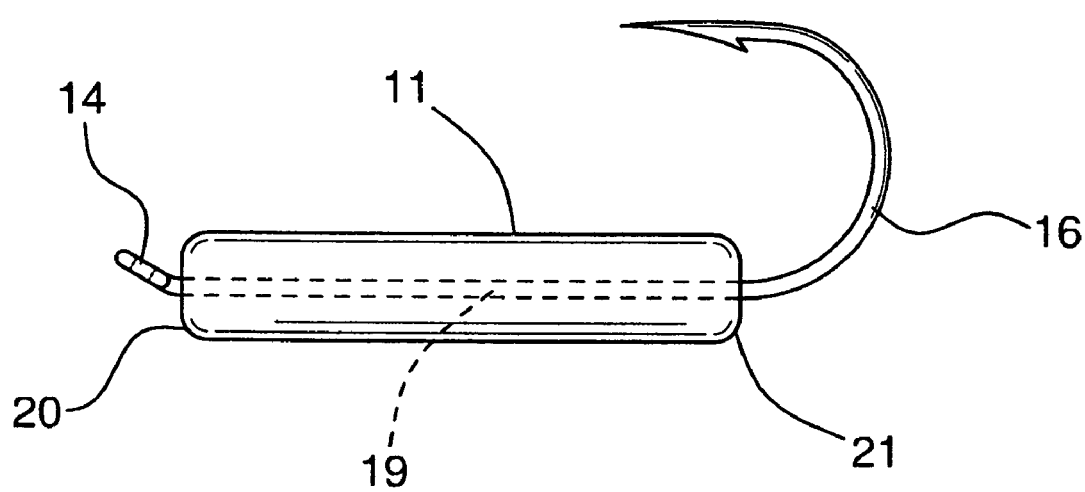
FIG. 6 is a schematic side view of a weighted fish hook in accord with this invention.

FIGS. 1-4 show a fishing lure 10 in accord with this invention. A weight 11 is secured to a hook 12 that has an eye 14 at its front end 15 and a curved bend 16 at its rear end 17 that terminates in a point 18. The shank 19 of the hook extends from eye 14 to the bend 16. As shown in FIG. 6, the weight 11 has a front end 20 located closely adjacent to the eye 14 hook and a rear end 21 located closely adjacent to the bend 16.

A flexible, waterproof plastic film 27 that can be colored brightly and/or printed on completely surrounds and envelops the weight 11. The plastic film 27 may be a polyester film, an oriented polyester such as DuPont MYLAR, a holographic film, a holographic polyester film, or other highly visible types of plastic film.

The film 27 may be tied to the hook shank 19 at spaced locations by strands of material such as nylon thread, polypropylene, mono filament fishing line, metal wire or the like. A first strand 30 encircles the plastic film 27 and shank 19 between the eye 14 and the front end 20 of the weight and is tied into a first knot 31 that compresses the plastic film against the hook shank between the eye 14 and the weight front end 20 closely adjacent to the eye. A second strand 32 encircles the plastic film 27 and shank 19 between the hook bend 16 and the rear end 21 of the weight and is tied into a second knot 33 that compresses the plastic film against the hook shank between the bend 16 and rear end of 20 of the weight closely adjacent to the bend. Simulated eyes 34 may be glued or otherwise attached to the outside of the film 27 on opposite sides of the lure 10. Designs may be printed or colored on the film.

There is a slit 35 in the plastic film 27 that divides the film into a pair of integral sections 36 and 37. The hook bend 16 is located within the slit 35 with section 36 being on one side of the bend and the other section 37 being located on the opposite side of the bend. The sections 36 and 37 extend past the bend beyond the rear end 17 of the hook. The inner or facing surfaces of the film sections 36 and 37 are made to adhere to each other beyond the rear end of the hook. A notch 38 has been cut into the adhered sections 36 and 37 so that they are arranged and configured to resemble a tail 40 of an aquatic creature, such as a minnow, beyond the rear end of the hook.

Figure 1:
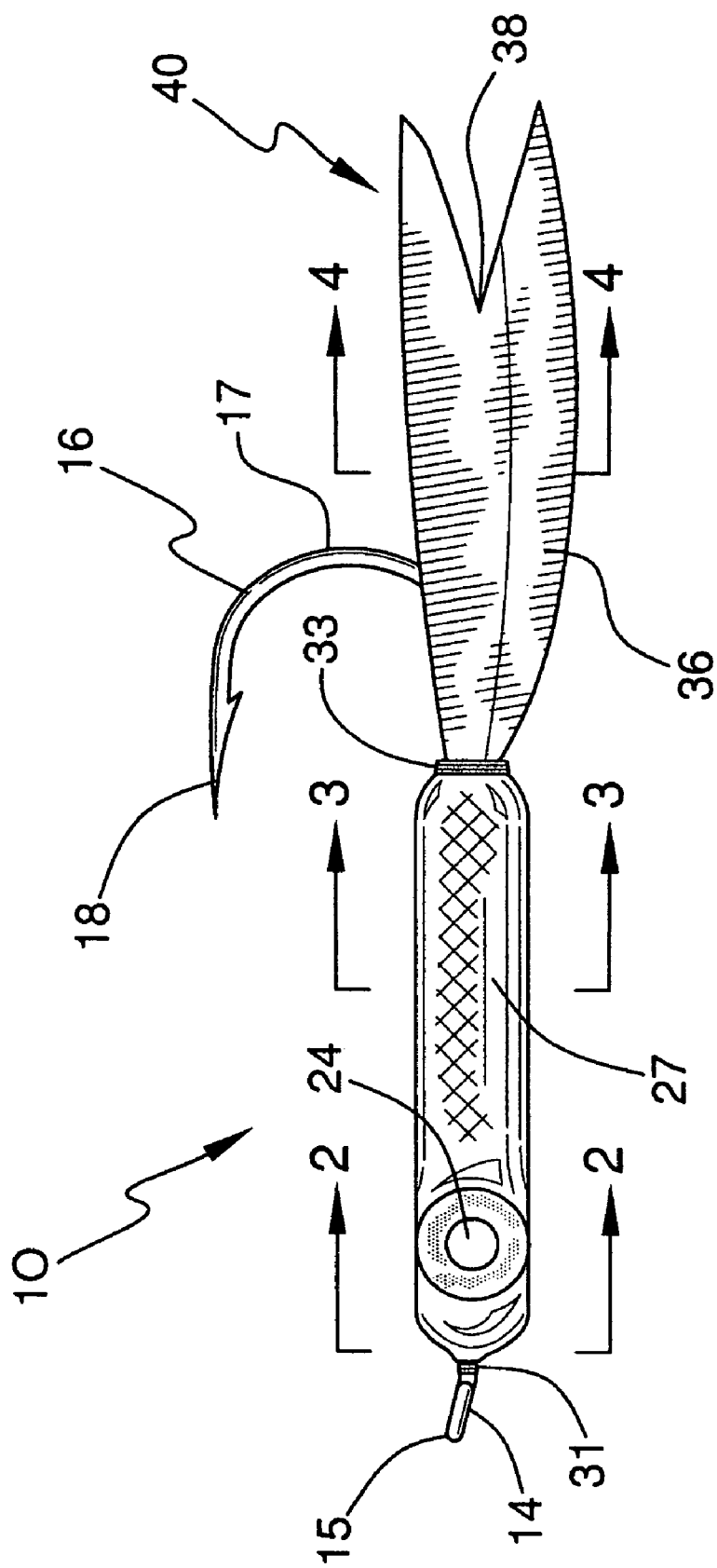
FIG. 1 is an enlarged schematic side view of an embodiment of a fishing lure in accord with this invention.
Figure 2:
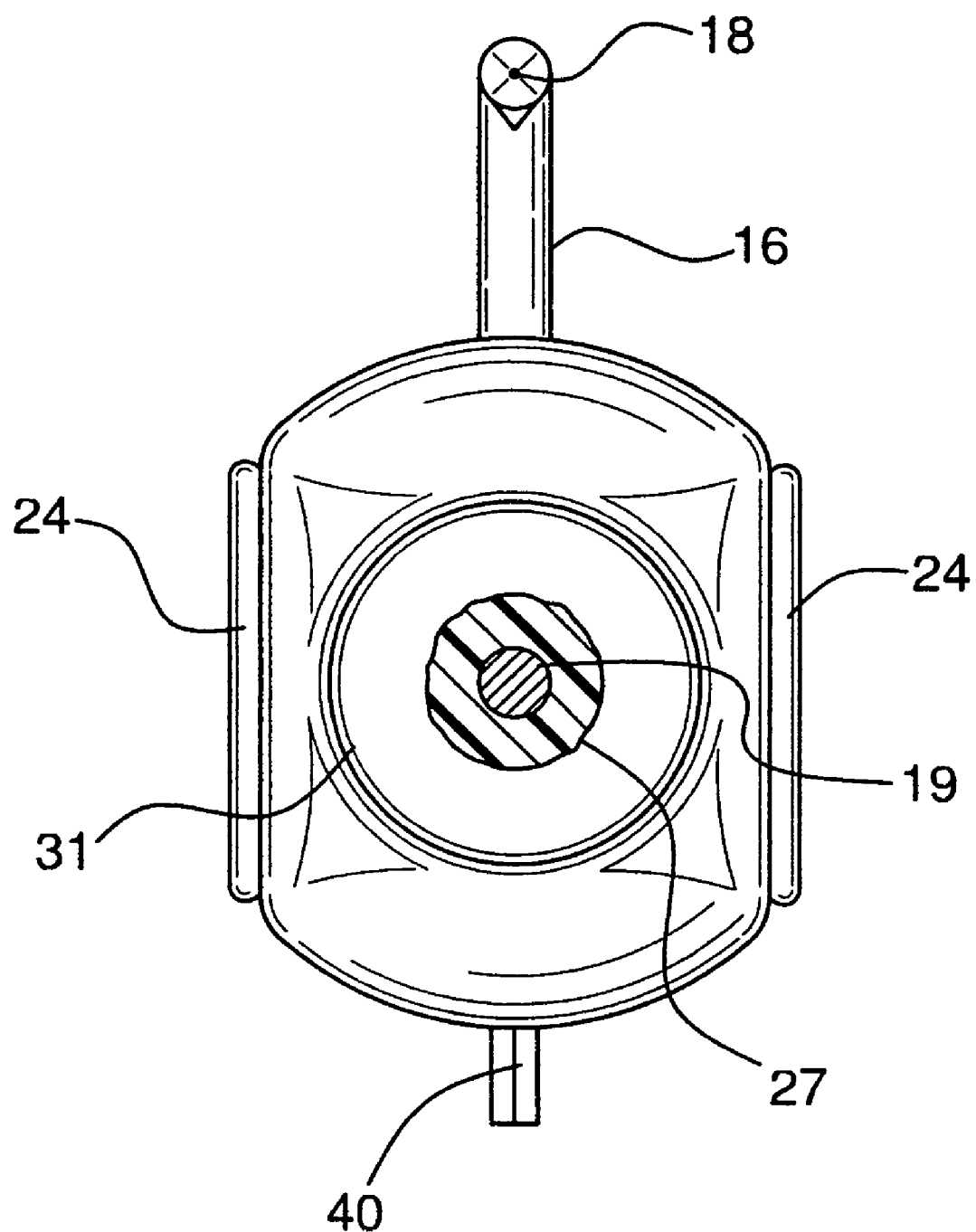
FIG. 2 is a cross sectional view taken along the line 2-2 in FIG. 1.
Figure 3:
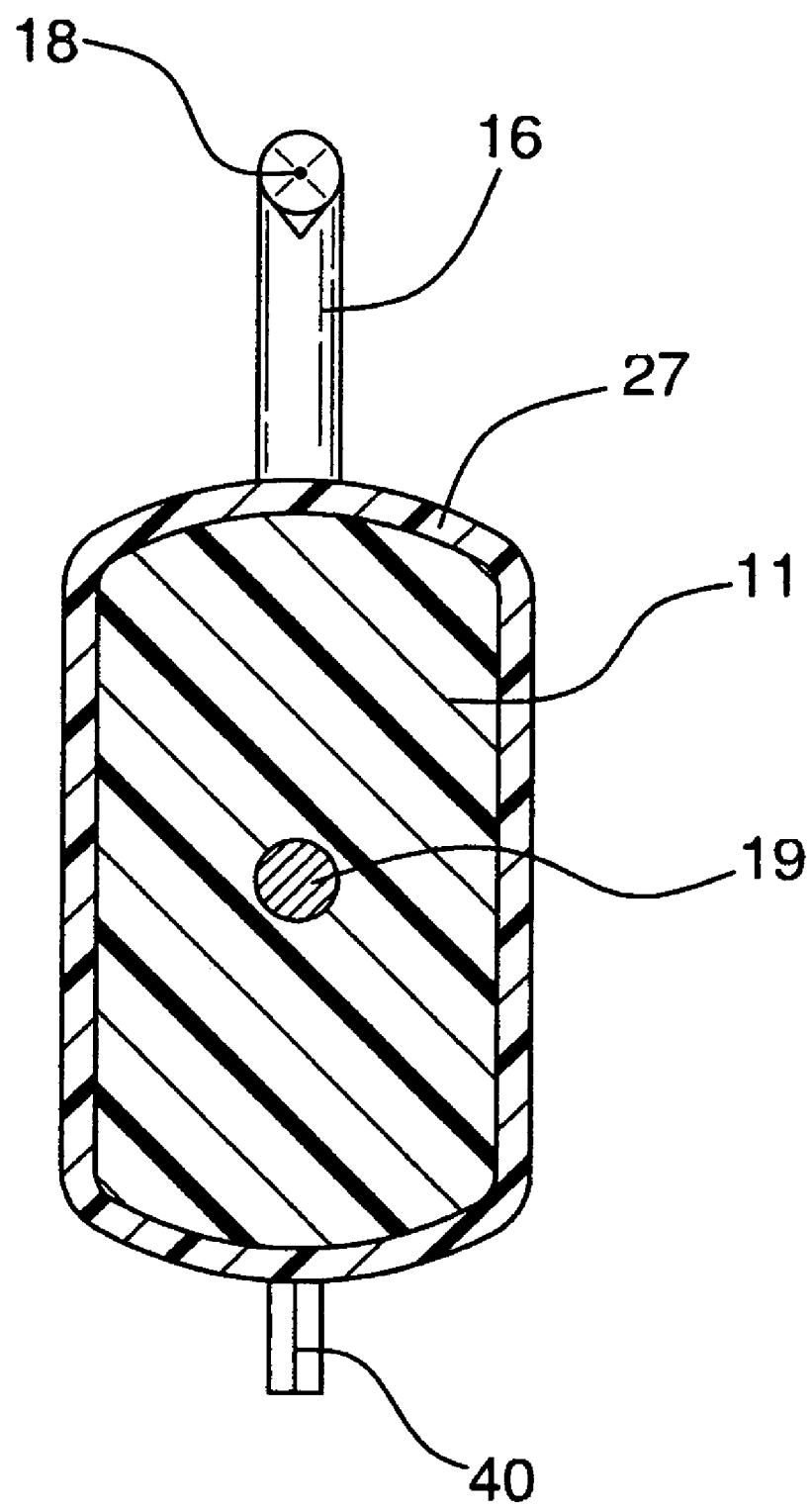
FIG. 3 is a cross sectional view taken along the line 3-3 in FIG. 1.
Figure 4:
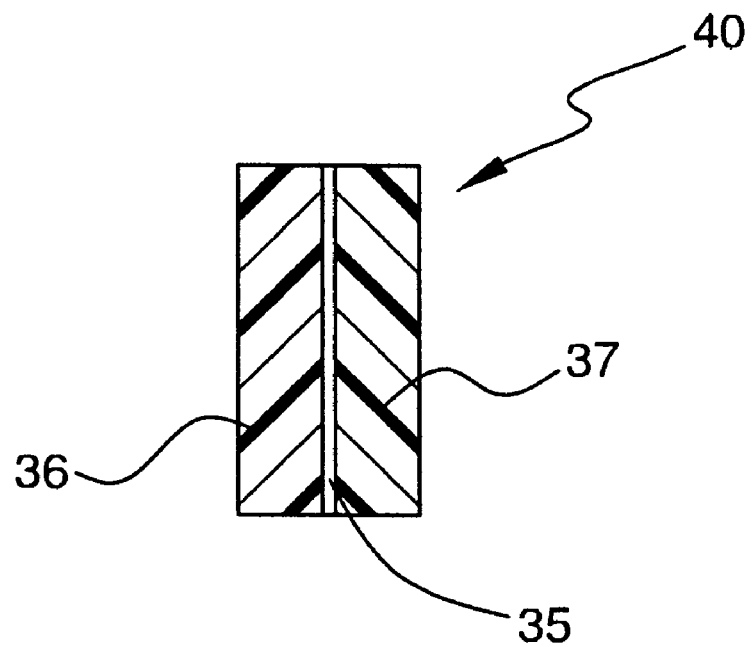
FIG. 4 is a cross sectional view taken along the line 4-4 in FIG. 1.
Figure 5:
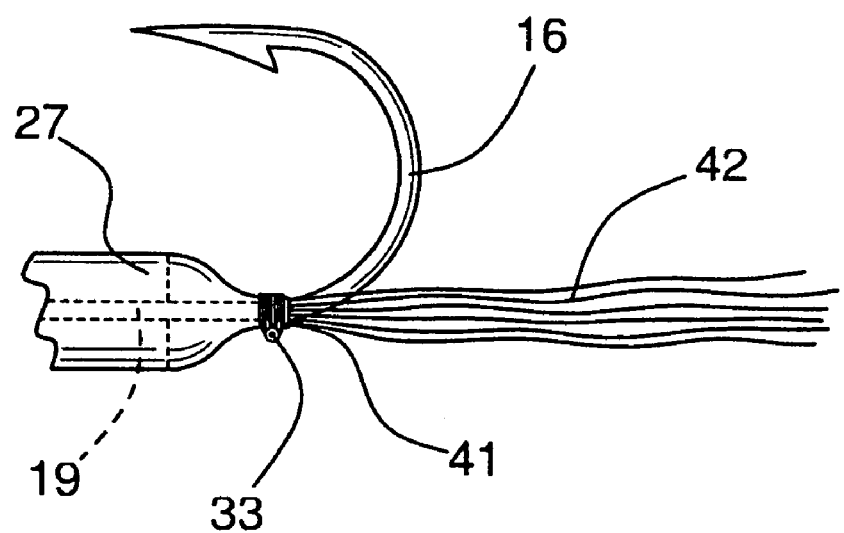
FIG. 5 is an enlarged fragmentary schematic side view of another embodiment of the invention.

FIG. 5 shows another embodiment in which the end 41 of the plastic film 27 terminates at the second knot 33, and the ends of filaments 42 of flexible material, such as feathers, hair or synthetic fiber, have been tied to the shank 19 by the knot to simulate a tail.

Figure 7:
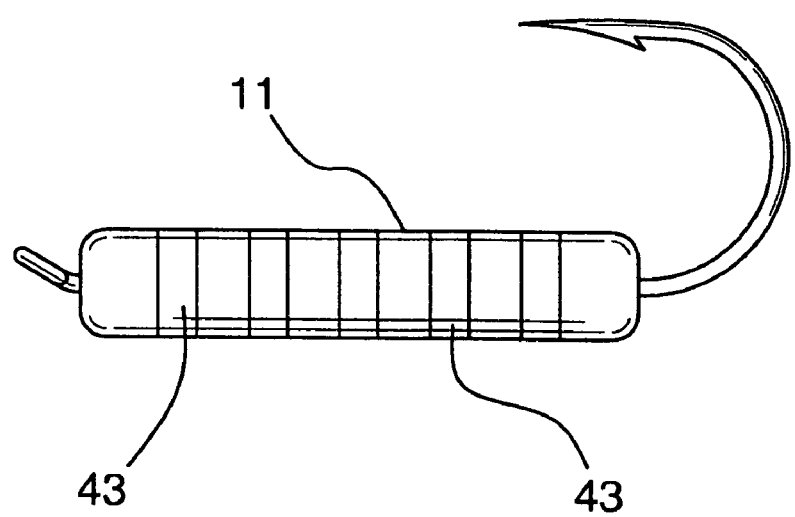
FIG. 7 is a schematic side view of another embodiment of the invention.
Figure 8:
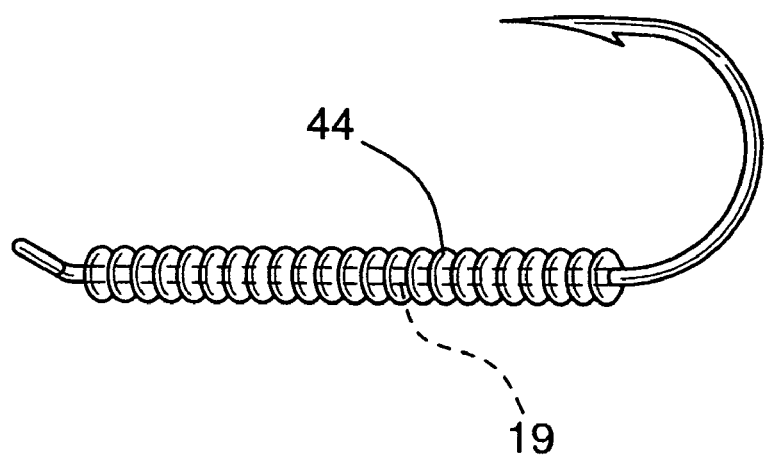
FIG. 8 is a schematic side view of another embodiment of the invention.

FIGS. 6-15 illustrate methods of making the fishing lure 10. The weight 11 in FIG. 6 may be affixed to the hook 12 by casting molten metal around the hook in a mold. The weight 11 may also be attached by providing a slit in the weight into which the hook shank 19 is placed and then crimping the weight around the hook in a manner similar to the way a split shot is crimped on to a fishing line. The weight 11 may have any cross sectional configuration, such as a circle, oval, rectangle, square, triangle, trapezoid or polygon with any number of sides. FIG. 7 shows an another embodiment in which the weight 11 has a plurality of spaced vertical grooves 43 that will give the lure 10 a broken outline that will increase the number of angles at which light and sound are reflected by the lure. The weight 11 may be made from a metal such as lead, brass, copper or stainless steel, or a ceramic or glass, or a combination of such materials. Another embodiment is shown in FIG. 8 where the weight is a wire or strip 44 of flexible metal such as lead, copper or brass that has been wound around the hook shank 19.

Figure 9:
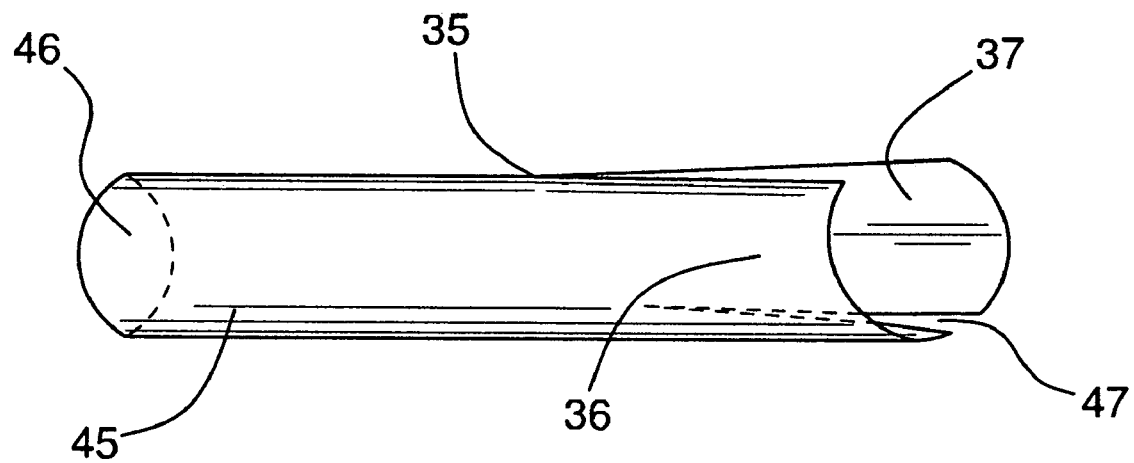
FIG. 9 a schematic side view of a split tube of plastic film in accord with this invention.
Figure 10:
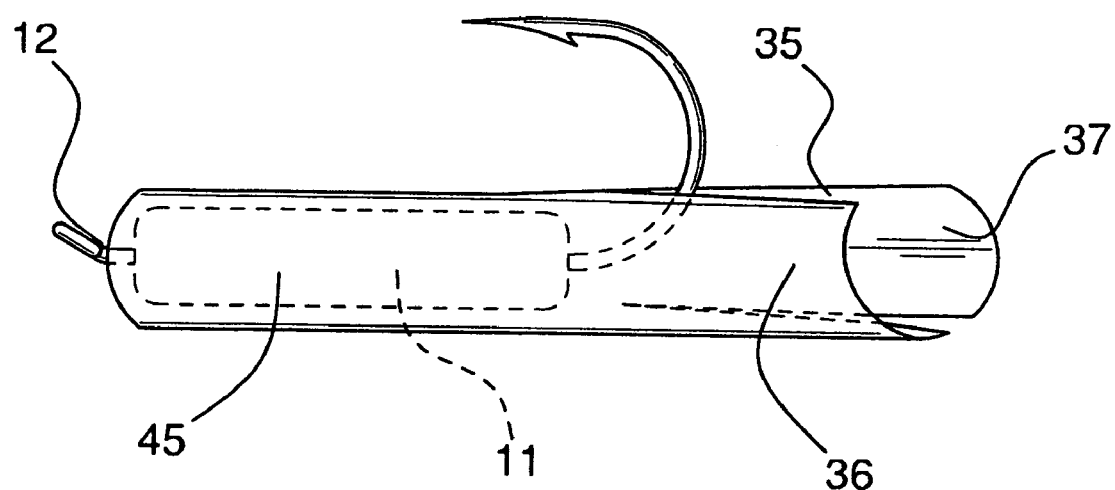
FIG. 10 is a schematic side view of a step in the making of the lure in FIGS. 1-4.
Figure 11:
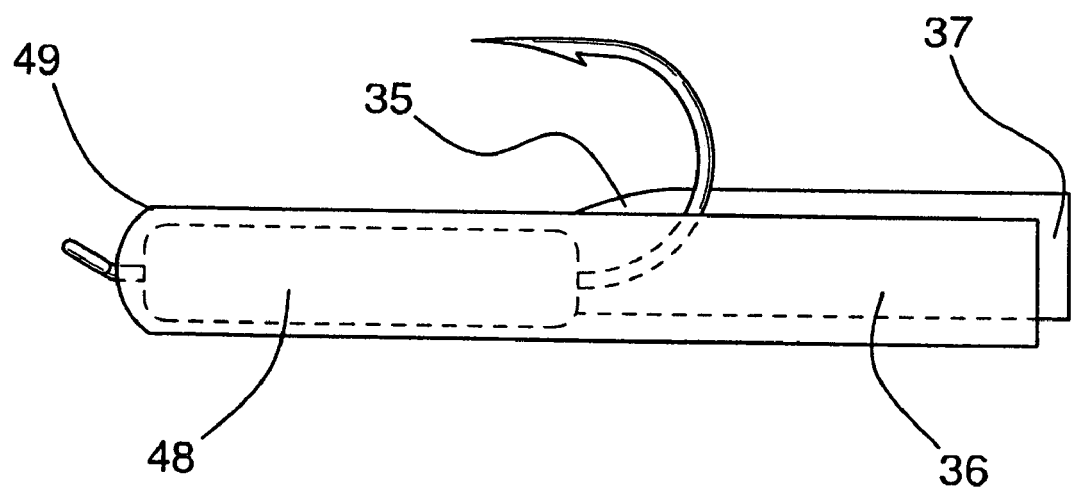
FIG. 11 is a schematic side view of another embodiment of a step in the making of the lure in FIGS. 1-4.

FIG. 9 shows that the plastic film 27 may be in the shape of a tube 45 that is open at both of its ends 46 and 47. The end 47 may be cut to form the slit 35 that defines the sections 36 and 37. As shown in FIG. 10, the hook 12 and attached weight 11 have passed through the silt 35 and been inserted into the tube 45 so that the weight 11 is completely enveloped in the plastic film. FIG. 11 shows another embodiment in which the plastic film 27 is a flat sheet 48 that has been folded at its center 49 with the slit 35 cut along the center.

Figure 12:
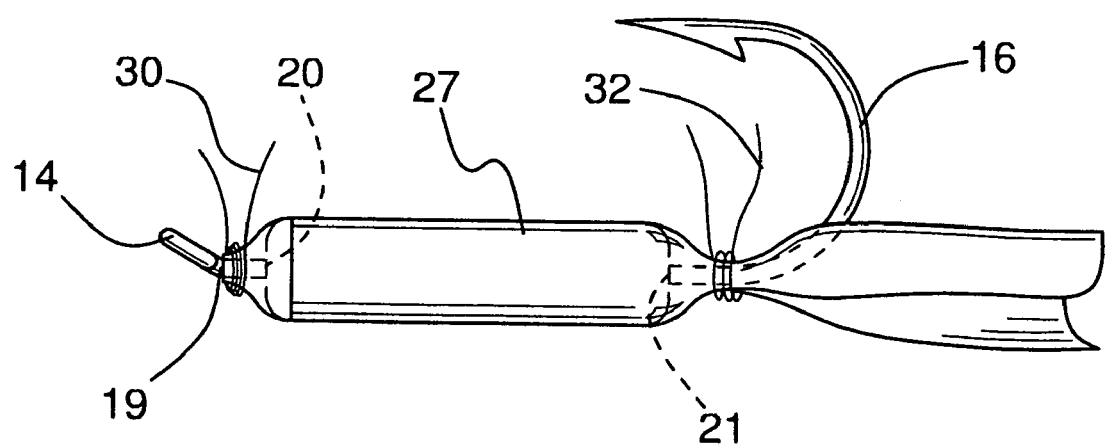
FIG. 12 is a schematic side view of another step in the making of the lure in FIGS. 1-4.

FIG. 12 shows the first strand 30 encircling the tube 45 or sheet 48 that defines the plastic film 27 and shank 19 between the front end 20 of the weight and the eye 14, and the second strand 32 encircling the plastic film 27 and shank 19 between the rear end 21 of the weight and the bend 16. The first strand 30 and is then tied into the first knot 31 which compresses the plastic film 27 against the hook shank 19 between the front end 20 of the weight and eye 14 closely adjacent to the eye. The second strand 32 is then tied into the second knot 33 which compresses the plastic film 27 against the hook shank 19 between the rear end 21 of the weight and bend 16 closely adjacent to the bend.

The sections 36 and 37 that extend beyond hook bend 16 may be adhered to each other beyond the bend by glue, fusion from sonic welding or heat sealing with a heated clamping tool 50. Then a triangular wedge 51 may be cut out of the adhered sections so as to define a pair of triangular fins 52 and 53 that resemble the tail of an aquatic creature, such as a small fish. The tool 50 may have projections 54 that mate with indentations 55 that will produce wrinkles 56 in the fins 52 and 53 and adjacent area of the tail so that this irregular surface on the lure 10 will increase the number of angles at which light and sound are reflected by the lure.

Figure 16:
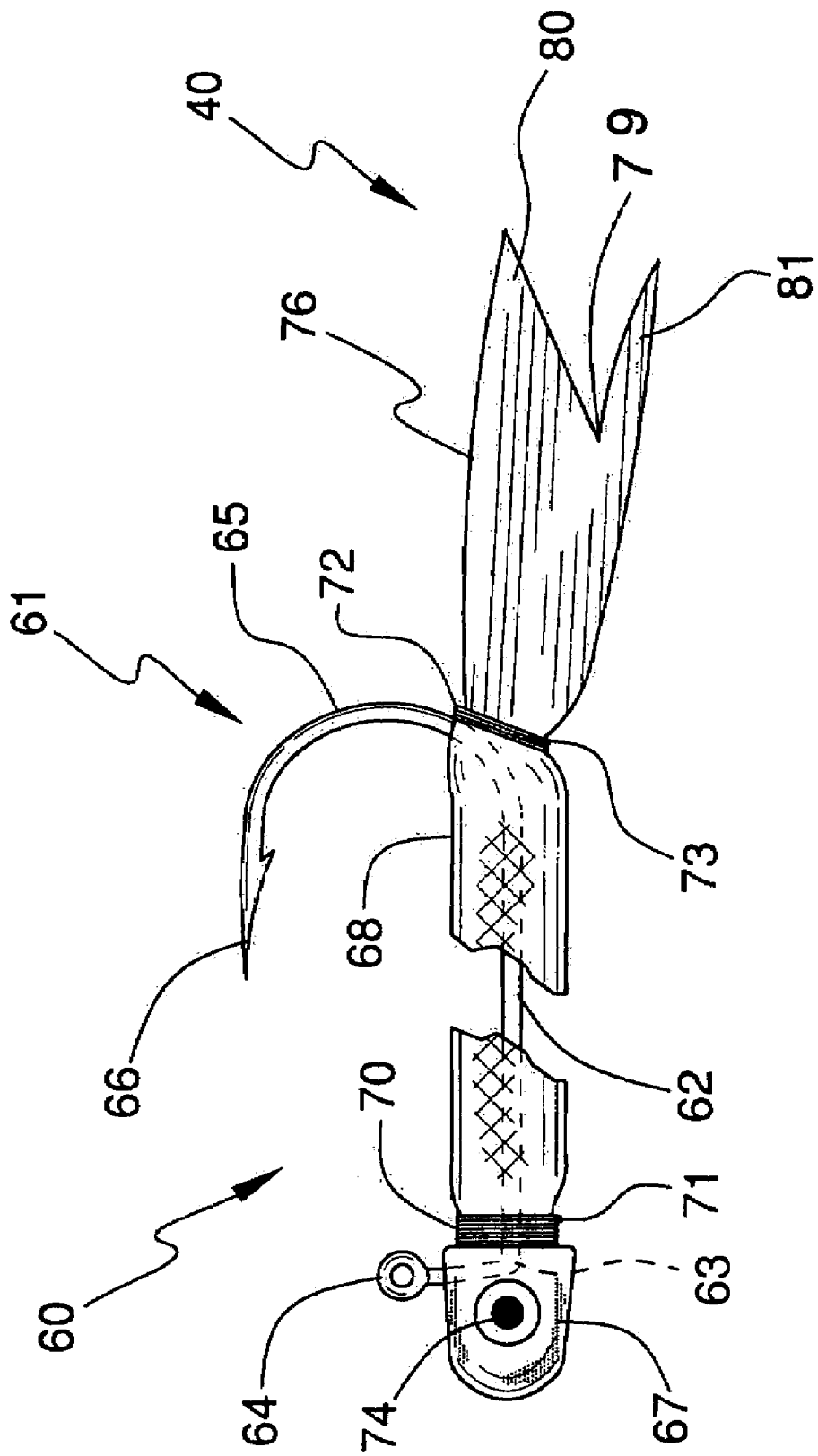
FIG. 16 is an enlarged, schematic, partially broken away, side view of another embodiment of a fishing lure in accord with this invention.
Figure 17:
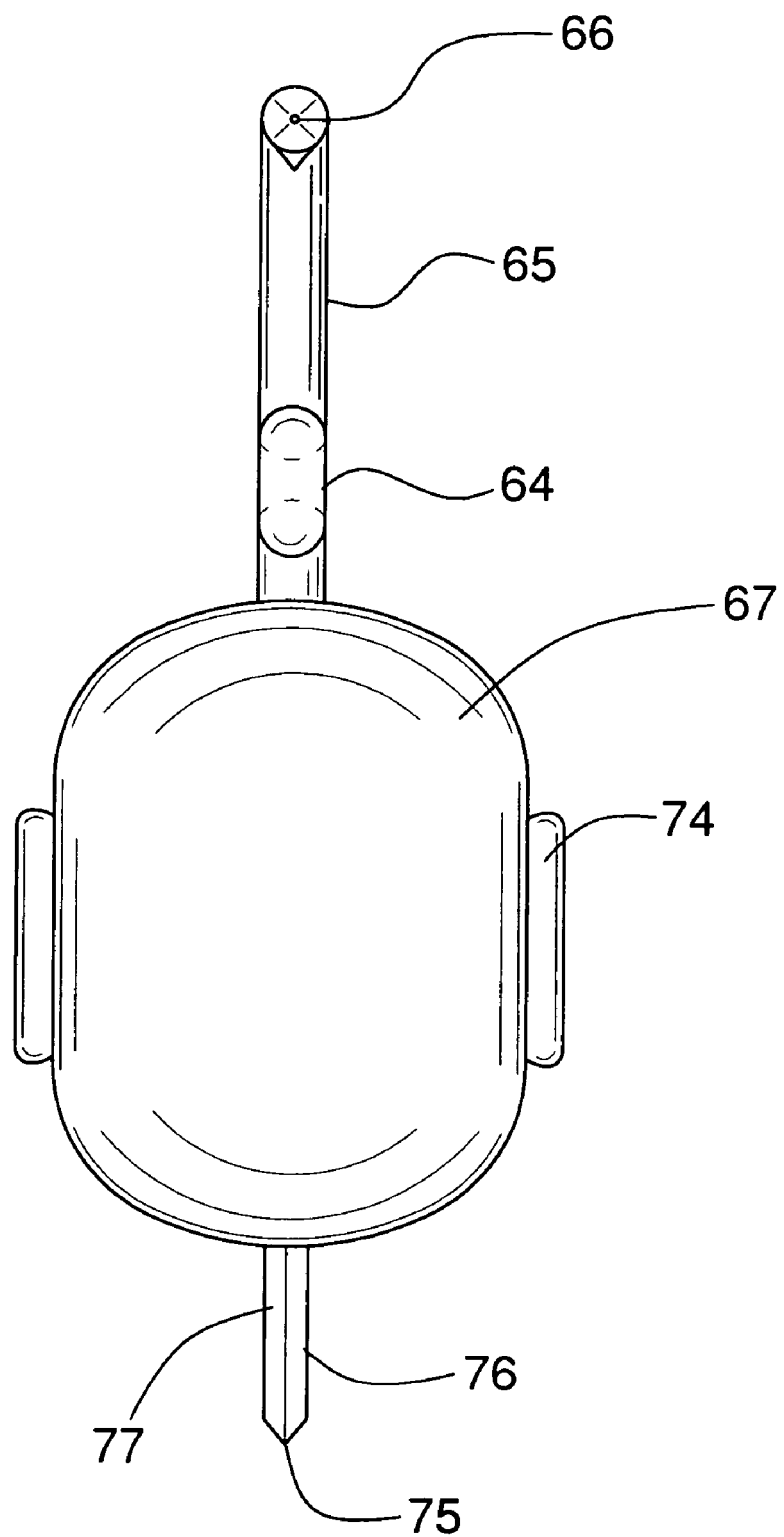
FIG. 17 is an enlarged front end view of the fishing lure shown in FIG. 16.

FIGS. 16 and 17 show another fishing lure 60 in accord with this invention. A hook 61 has a shank 62 with a right angle bend 63 at its front end, and an eye 64 at the top of the bend 63. The rear of shank 62 has a curved bend 65 that terminates in a point 66. A weight 67 is secured to shank 62 and encompasses a portion of bend 63. The weight 67 is located below the eye 64 and may protrude beyond and ahead of the hook.

A flexible, waterproof plastic film 68 identical to the film 27 described above surrounds and envelops a portion of the lure 60. The film 68 may be in the form of either an opened tube or a folded sheet, as described above with reference to FIGS. 10 and 11, and may envelop a portion of shank 62.

The film 68 may be tied to the hook shank 62 by strands of material such as nylon thread, polypropylene, mono filament fishing line, metal wire or the like. A first strand 70 encircles the plastic film 68 and shank 62 behind the weight 67 and is tied into a first knot 71 that compresses the plastic film 68 against the hook shank behind the weight 67. A second strand 72 may encircle the plastic film 68 beyond the hook bend 65 and may be tied into a second knot 73 that compresses and partially collapses the plastic film to the rear of the hook 61. Simulated eyes 74 may be glued or otherwise attached to the outside of the weight 67 on opposite sides of the lure 60. Designs may be printed or colored on the film 68.

The plastic film 68 has a slit 75 that divides the film into a pair of integral sections 76 and 77. The hook bend 63 is located within the slit 75, in the manner shown in FIGS. 10 and 11, with one section 76 being on one side of the bend and the other section 77 being located on the opposite side of the bend. The sections 76 and 77 extend past the bend 63 beyond the rear end of the hook 61. The inner or facing surfaces of the integral film sections 76 and 77 are made to adhere to each other beyond the rear end of the hook 61 by glue, fusion from sonic welding or heat sealing with a heated clamping tool, such as 50. The tool 50 may have projections 54 that mate with indentations 55 that will produce wrinkles 56 in the fins and adjacent area of the tail so that this irregular surface on the lure 60 will increase the number of angles at which light and sound are reflected by the lure.

Figure 13:
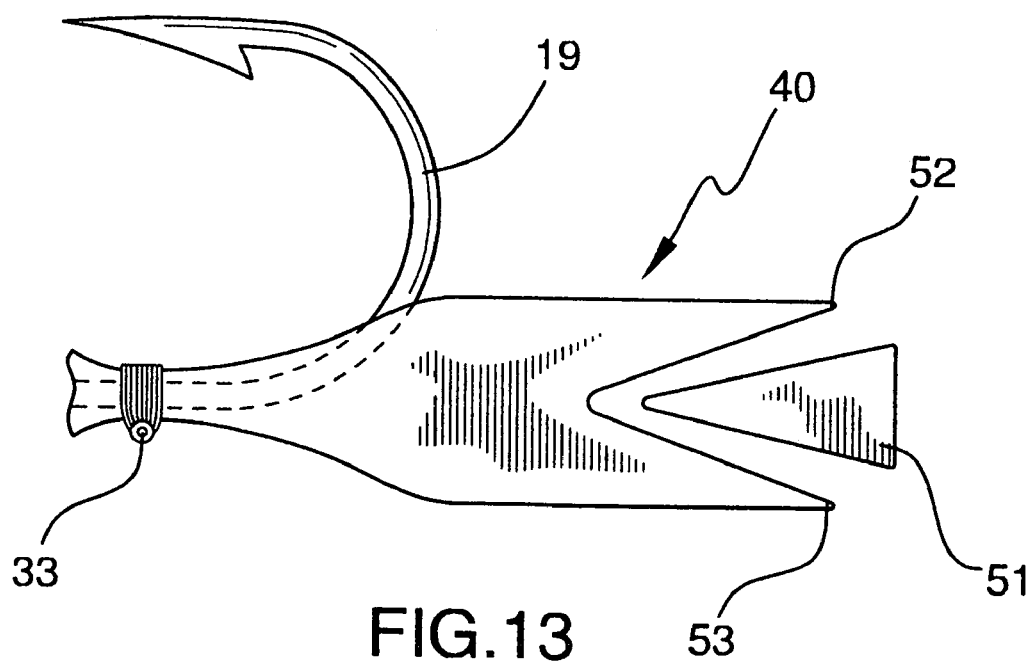
FIG. 13 is a fragmentary enlarged schematic side view of another step in the making of the lure in FIGS. 1-4.
Figure 14:
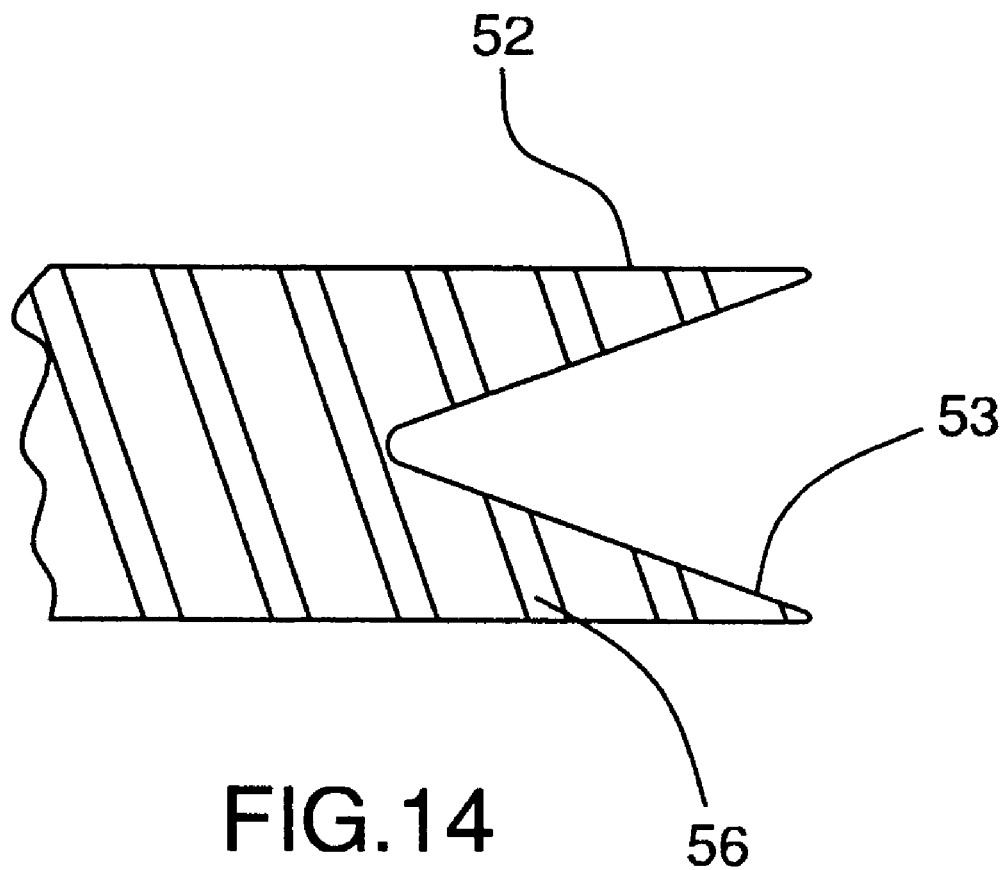
FIG. 14 is a fragmentary enlarged schematic side view of another embodiment of the invention.
Figure 15:
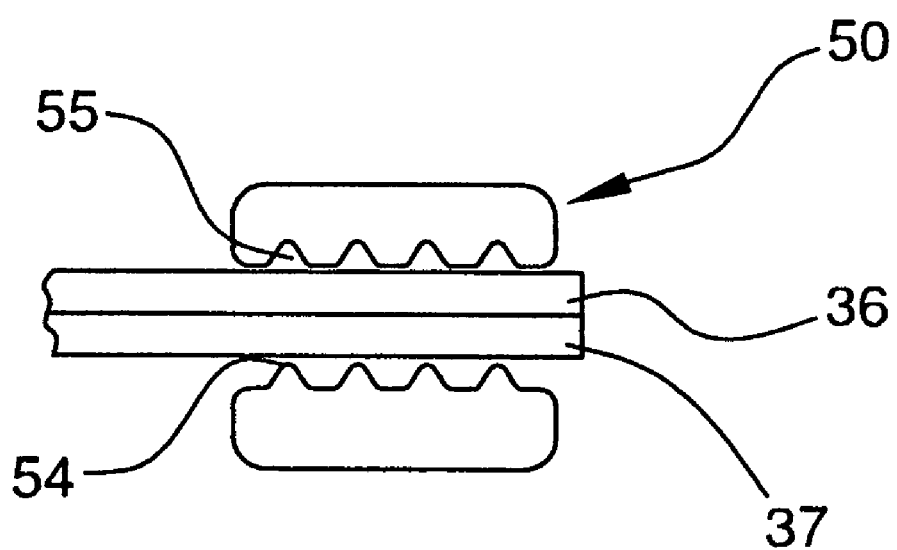
FIG. 15 is a fragmentary schematic end view showing a method of making the embodiment of FIG. 14.

A notch 79 may be formed in the adhered sections 76 and 77 by cutting a triangular wedge out of the adhered sections, in the manner shown in FIG. 13, so as to define a pair of triangular fins 80 and 81 that resemble the tail of an aquatic creature, such as a minnow, beyond the rear end of the hook.

It is also possible to provide a tail for the embodiment of the lure 60 shown in FIGS. 16 and 17 in essentially the same way as a simulated tail is provided in FIG. 5 by terminating the plastic film 68 within the hook bend 65 and tying filaments, such as 42, to the hook shank 62 with a second knot, like 33, in a second strand, like 32, that would compress the film 68 against the hook shank 62 in the same way shown in FIG. 5.

While the present invention has been described with reference to particular embodiments and methods, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. A fishing lure comprising: a hook having an eye at its front end and a curved bend at its rear end that terminates in a point, a hook shank extending from said eye to said curved bend, a plastic film enveloping a portion of said lure, a first strand encircling said plastic film at a first location, said first strand being tied into a first knot at said first location that compresses said plastic film against said hook shank at said first location, a second strand encircling said plastic film at a second location that is spaced from said first location, said second strand being tied into a second knot that compresses said plastic film at said second location, a weight affixed to said hook shank between said curved bend and said eye, a right angle bend in said hook shank adjacent the front end of said hook, said weight encompassing a part of said right angle bend, below said eye, said weight protruding ahead of said hook, said first strand compressing said plastic film against said hook shank behind said weight, there being a slit in said plastic film that divides said film into a pair of sections, said curved bend of said hook being located in said slit with one of said sections being on one side of said curved bend and the other section being located on the opposite side of said curved bend, said sections being sealed to each other beyond said rear end of said hook, and said second knot compressing and partially collapsing said pair of sealed sections of said plastic film beyond said curved bend past the rear end of said hook.

2. A fishing lure as defined in claim 1, further comprising, said integral portion of said plastic film extending past said curved bend beyond said rear end of said hook being arranged and configured to resemble the tail of an aquatic creature.

3. A fishing lure as defined in claim 1, further comprising, there being grooves and indentations in said adhered sections.

4. A fishing lure as defined in claim 1, further comprising, there being a notch in said adhered sections of plastic film that resembles a tail of an aquatic creature.

* * * * *